United States Patent [19]

Skarstad

[11] 4,182,798

[45] Jan. 8, 1980

[54] PREFORMED POLYMER SHEET IN COMBINATION WITH THE ANODE OF ELECTROCHEMICAL CELLS

[75] Inventor: Paul M. Skarstad, Wayzata, Minn.

[73] Assignee: Medtronic, Inc., Minneapolis, Minn.

[21] Appl. No.: 885,514

[22] Filed: Mar. 13, 1978

[51] Int. Cl.² ............................................ H01M 6/18
[52] U.S. Cl. .................................... 429/213; 29/623.1
[58] Field of Search ................ 429/191, 213; 29/623.1

[56] References Cited

U.S. PATENT DOCUMENTS

| 3,660,164 | 5/1972 | Hermann et al. | 429/191 |
| 3,944,433 | 3/1976 | Mead et al. | 429/213 |
| 4,071,662 | 1/1978 | Mead et al. | 429/178 |

*Primary Examiner*—Donald L. Walton
*Attorney, Agent, or Firm*—Schroeder, Siegfried, Ryan, Vidas, Steffey & Arrett

[57] ABSTRACT

An electrochemical cell, as initially assembled, wherein the metallic anode is contacted at least on its operative surface by a preformed self-supporting sheet of poly-2-vinylpyridine.

36 Claims, 2 Drawing Figures

PREFORMED POLYMER SHEET IN COMBINATION WITH THE ANODE OF ELECTROCHEMICAL CELLS

BACKGROUND OF THE INVENTION

This invention relates to electrochemical cells of the type utilizing a metallic anode and a charge-transfer-complex type of cathode, which includes an organic electron-donor component and an electron-acceptor component. In some such cells, for example, a solid electrolyte, such as lithium iodide, may form in situ from the interaction of a halogen-polymer complex with a metallic lithium anode. Electrochemical cells of this type have found use, for instance, as implantable cardiac pacemakers.

Recently, coating of the metallic anode in such cells, at least on the operative surface thereof, with an organic donor material, has been proposed by others. In cells having such coatings, preferably but not necessarily, the organic donor component of the charge-transfer complex used in the cathode of the cell is the same organic material as is used for the coating.

The procedure heretofore proposed for coating the metallic anode involves the painting thereon of a solution of the donor material, for example poly-2-vinyl-pyridine dissolved in a suitable solvent such as benzene, and the subsequent evaporation of the solvent to leave the polymer remaining on the anode in the form of a coating.

SUMMARY OF THE INVENTION

This invention constitutes an improvement in the above described method of providing the organic donor material in association with the anode and cathode of an electrochemical cell. In accordance with this invention, organic donor material of poly-2-vinylpyridine (P2VP) is prepared separately in self-supporting sheet-like form of desired thickness. The sheet is cut to any desired size and shape. During cell assembly, the polymer sheet is positioned against at least the operative anode surface to be interposed between the anode and the cathode of the electrochemical cell. The aim is preferably to substantially cover at least the operative surface of the anode with the sheet material.

Upon aging, the sheet tends to become integrated into the cathode material. Upon discharge, the cathode tends to become separated from the anode. For example, if the cathode material includes iodine, a metal iodide forms on the anode. In the case of lithium anodes, lithium iodide is formed. Consequently, the sheet is closely associated with the metallic anode at least initially, i.e. upon assembly, and is so described herein.

The preformed self-supporting sheet of material may be prepared by various methods. However, hot-pressing the organic donor component material to an appropriate thickness on an inert substrate from which it can be removed in the form of a sheet has been found to be most appropriate.

In positioning the sheet in the cell for use, it can be merely positioned against the anode surface, or, if desired, it can be attached thereto by means of an adhesive.

Use of the preformed self-supporting sheet according to the present invention offers several advantages over the prior art. For example, there is the advantage of reduced manufacturing time and cost. The prior art procedure referred to above involves painting a solution of the polymer on the anode and allowing the solvent to evaporate. Painting is a slow procedure requiring careful work by the painter. Evaporation of the solvent requires about one-half hour for a single coat. Consequently, when manufacturing cells, coated anode assemblies must be prepared beforehand. On the other hand, separate preparation of the sheet as proposed by this invention allows time saving by more direct assembly, and the assembly is more simple to complete.

Another advantage offered by this invention is that of improved quality control. Because the sheet is prepared separately, uniformity can be more readily assured for thickness and other pertinent parameters.

Since the drying time is eliminated, exposure of the sheet and the metallic anode to the atmosphere is minimized. This allows better control of atmospheric contaminants such as moisture and the like.

When the sheet is prepared according to this invention by hot-pressing or any other suitable technique which does not involve the use of a solvent, there is no residue of solvent left in the polymer.

Use of the preformed polymer sheet also avoids solvent and coating contamination of other parts of the electrochemical cell assembly. Such contamination can be a problem associated with the use of the prior art painting technique.

DETAILED DESCRIPTION OF THE PREFERRED EMBODIMENTS

A cell according to the present invention includes a container for the cell components. After placing the components in the container, it is closed and sealed for use in a suitable manner. The container is of a material which is non-reactive with the cell components and is molded or otherwise formed to a desired configuration. The cell components comprise a metallic anode suitably positioned within the container, and a cathode including a material in the form of a charge-transfer complex comprised of an organic donor component and an electron acceptor component. The charge-transfer complex operatively contacts the anode through a self-supporting body, preferably a thin sheet, of P2VP. Preferably but not necessarily P2VP is also used for the charge-transfer complex component of the cell cathode. The sheet of P2VP is positioned against the operative surface of the anode upon assembly of the cell. Suitable electrical contact is made to the anode and cathode by means of current collectors or other suitable electrical contacts which are connected to electrical conductors or lead-wires extending therefrom and out of the cell for connection to an external electrical circuit.

Figure 1:
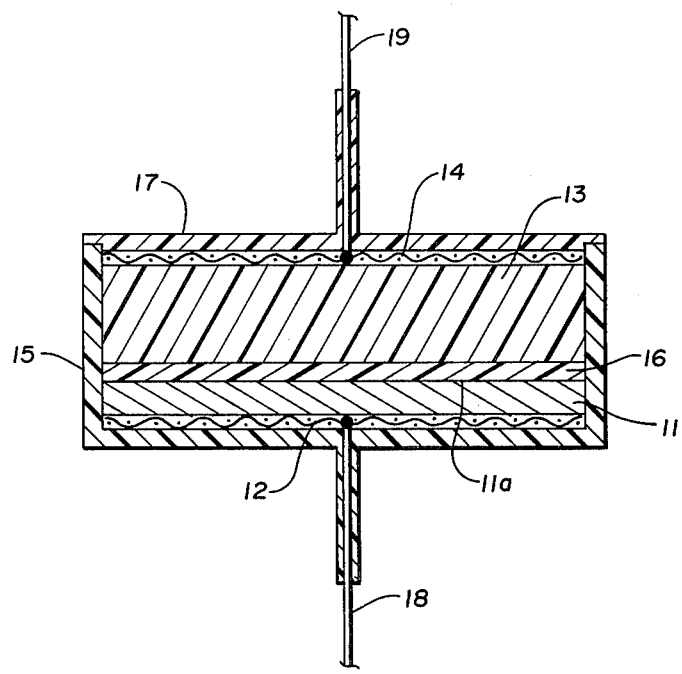
FIG. 1 is a sectional view of an electrochemical cell immediately following assembly and before discharge. The cell includes the self-supporting sheet of the present invention.

Referring to FIG. 1, the elecrochemical cell according to the invention may, for example, be preferably of the lithium-iodine type. The anode means preferably comprises a metallic lithium element 11 and a current collector 12 in contact therewith and which may take the form of a zirconium metal screen or mesh. In addition to lithium, various other anode metals may be used, such as lithium alloys with magnesium, zinc, copper, calcium, or silver, or other metals alone such as magnesium or silver, for example.

The cathode means preferably comprises a charge-transfer complex material comprising a polymer-iodine complex 13 and a current collector 14 in contact therewith. Cathode current collector 14 may, for example, be a platinum mesh screen material. However, the cathode may be of other types. For example, it may comprise conductive particles interspersed with a reducible material, such as graphite in iodine.

The anode and cathode means are positioned for electrochemical interaction within suitably shaped container 15 which, as previously mentioned, is comprised of a material inert to the contents thereof. A preferred material found to perform satisfactorily for this purpose is available commercially under the name Halar, a trademark of the Allied Chemical Company.

The organic donor component material of the charge-transfer complex in the preferred cathode is preferably a polyvinylpyridine polymer and, in particular, is most preferably P2VP. However, the 4-vinylpyridine polymer may also be used (P4VP). Other organic donor components such as those described in U.S. Pat. No. 3,352,720 to Wilson, et al., U.S. Pat. No. 3,660,163 to Moser, U.S. Pat. No. 3,660,164 to Herman, et al., and U.S. Pat. No. 3,674,562 to Schneider, et al., may also be used.

Generally, the preferred cathode means 13 comprises an organic material which is an electron donor. It will preferably be an organic compound containing a double bond or an amine group, although as already pointed out, many types of donor compounds are known in the prior art and are operable within the context of this invention.

The foregoing materials are organic electron donor materials of the organic group of organic compounds known as charge-transfer complex donors. These compounds also are preferably members of the chemical classes of polycyclic aromatic compounds, heterocyclic compounds containing nitrogen, or polyvinyl compounds in which a heterocyclic nitrogen moiety is incorporated as a side chain or substituent.

Preferably, the cathode complex, particularly in the case of P2VP or P4VP, will be of the type including a charge-transfer complex having an excess of acceptor component relative to the donor component. The electron acceptor component of the preferred cathode material is preferably one of the halogens, most preferably either iodine or bromine. Interhalogens, such as iodine monobromide and the like, may also be used as acceptor components.

Interposed between the anode means and the cathode means during cell assembly is a preformed body 16 of self-supporting poly-2-vinylpyridine (P2VP). Body 16 is preferably in the form of a sheet as shown and is positioned against the operative surface 11a of anode 11.

For assembly, after placing the anode and the polymer sheet in the cell container, the cathode is then positioned thereon. The organic complex for the preferred cathode may be prepared by heating the donor and acceptor components to a temperature, greater than the crystallization temperature of the iodine, for example. The amount of iodine used will preferably be greater than about 90 percent by weight of the resulting complex mixture to provide high capacity and long life. The amount of halogen, particularly in the case of iodine, will preferably be greater than about one mole iodine ($I_2$) per equivalent of the donor.

Desirably, the resultant complex mixture is viscous but flowable. Consequently, it may be introduced into the container by simply pouring it over the anode means and sheet 16, which will have been previously introduced into the container as already pointed out. The material fills the interior of container 15 in an amount sufficient to cover anode 11 and sheet 16. The cathode current collector 14 and electrical contact means 19 may then be positioned in container 15. Finally, the container is sealed by placement of cover member 17 and sealing with an epoxy or similar material. Cover 17 is preferably of the same material as container 15 and may be sealed by any suitable means.

An opening is provided in container 15 and cover 17 to permit electrical conducting means 18 and 19, respectively, surrounded by electrical insulation material which is inert with respect to the cell components, to exit for connection to external circuit means. Conducting means 18 and 19 extend through the sealed apertures and make internal electrical connection to anode 11 and cathode means 13, respectively.

The lithium-iodine cell described above is believed to operate in the following manner. A lithium-iodine electrolyte (not shown) is formed in situ by reaction of the iodine in the cathode complex with the metallic lithium anode. The formation of the lithium iodide electrolyte begins after the iodine-containing cathode complex material 13 is placed against sheet 16 as iodine diffuses through the sheet. As a result of this operative electrochemical contact, an electrical potential difference exists between the anode and cathode electrical leads. The exact mechanism by which the iodine-containing cathode material 13 and the lithium anode 11 come into operative contact through sheet 16 is not known in detail.

If desired, the sheet may be made to adhere to the anode operative surface by the use of an adhesive. For example, a small amount of vinyl monomer may be used in the case of a vinyl polymer, such as 2-vinylpyridine for a poly-2-vinylpyridine (P2VP) sheet, or saturated vinyl monomers, such as 2-ethyl-pyridine for a P2VP sheet. Other suitable solvents may be used which do not adversely affect battery performance. The adhesive or solvent may be applied directly to the anode or, in the case of a solvent, it may be used to plasticize the contacting surface of the polymer sheet. However, the use of an adhesive is optional and is not necessary.

The present invention is also applicable to a cell in which more than one surface of the metallic anode is to be operatively exposed to the cathode material. Two or more sheets may be used in such an instance or a single sheet or a plurality of sheets may be incorporated as a wrapping or covering for the anode to cover multiple surfaces to be operatively associated with the cathode material.

EXAMPLES

Preformed self-supporting sheet was prepared according to the invention from poly-2-vinylpyridine by hot-pressing the granular polymer on a hydraulic press between heated platens at a temperature of about 130° C. to form a disc. The discs were then hot-pressed at about 240° C. to a thickness ranging from about 0.07 to 0.17 mm, about 0.12 mm being preferred. The sheets were pressed between the heated platens against a Teflon-coated fiberglass cloth held in the hot press, following which the fiberglass cloth was removed to leave a self-supporting sheet of material having an average thickness of about 0.121 mm corresponding to a film density of about 0.014 grams per square centimeter, assuming the bulk density of the poly-2-vinylpyridine to be about 1.1 to 1.2 grams per cubic centimeter.

Ten batteries were constructed by placing the sheet against the lithium anode and positioning the polymer-iodine complex against the sheet as described hereinabove. The batteries were disc-like in shape and of approximately one inch in diameter. Ten batteries using the prior art painted coating of poly-2-vinylpyridine were also prepared for comparison.

Five cells of each type were put on 10 KΩ and 100 KΩ load at 37° C. On the 10 KΩ tests, discharge was interrupted about every two weeks for 24 hours at open circuit and 24 hours at pacer current density via 470 KΩ load. Impedance measurements were made after the OCV reading but before the pacer load was applied.

Figure 2:
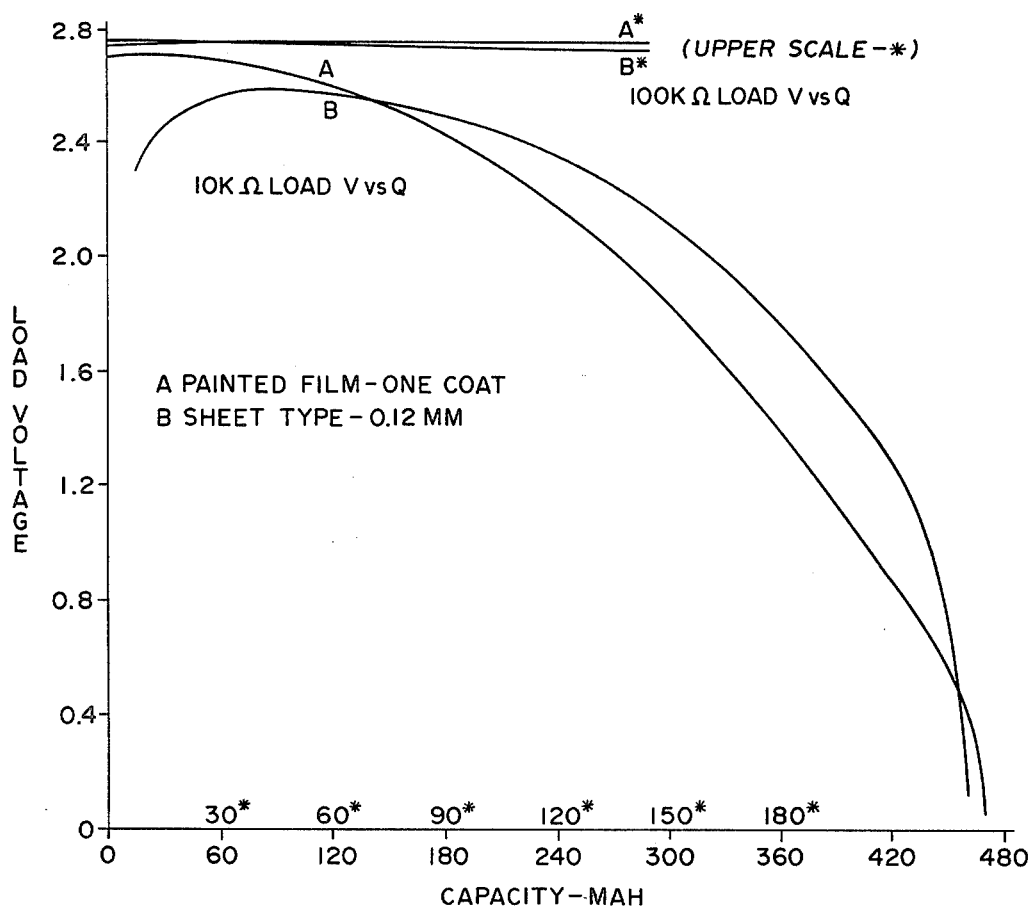
FIG. 2 is a graph showing discharge curves for cells incorporating the sheet of the invention as compared to cells having coatings painted on the anodes according to the prior art for the purpose of comparison to those of the present invention.

The 10 KΩ load tests were completed and the 100 KΩ tests had yielded about 24% of theoretical iodine capacity when these data were taken. FIG. 2 shows voltage vs. capacity for both loads. At 100 KΩ there is very little difference between cell types through 145 milliampere-hours of discharge. The initially low voltage of sheet-type cells under 10 KΩ load is more than compensated for by the larger usable capacity, compared to painted-anode cells. Individual cells of the sheet-type which showed the lowest load voltage initially also yielded the greatest capacity to cutoff, and vice versa. The following table compares the delivered capacities of both cell types.

TABLE

| | | Capacity - MAH | | | |
|---|---|---|---|---|---|
| Cell Type | Theoretical (Stoichiometric Iodine/%) | Delivered to 1.8v/% | (Milliampere-hour) Delivered to 1.0v/% | Total Delivered/% | S.D* |
| Painted | 589/100 | 305/52 | 405/69 | 469/80 | 8 |
| Sheet | 603/100 | 360/60 | 440/73 | 461/76 | 15 |

*Standard deviation in total delivered capacity.

The above data demonstrate that cells of the invention are comparable in performance to prior art cells. The important advantages of the invention lie in the improved manufacture and assembly of cells.

Individual cells have also been built including sheets according to this invention and in which the sheet was perforated, in which LiI was included between the anode and the sheet, in which IBr was used as the acceptor of the charge-transfer-cathode compound, and in which $ICl_3$ was used as the cathode material. These cells were operative and the invention is intended to cover such variations.

Having described the invention, what is claimed is:

1. An electrochemical cell comprising:
   an anode;
   a cathode; and
   a preformed body comprising P2VP in self-supporting form interposed between the anode and cathode, the body contacting the cathode and also contacting the anode at least initially upon assembly of the cell and prior to any electrolyte-forming discharge.

2. The cell according to claim 1 including an electrolyte between the body and the anode following a period of cell discharge.

3. The cell according to claim 1 wherein the cathode includes a charge-transfer complex of an organic donor component and an acceptor component.

4. The cell according to claim 3 wherein the anode includes an operative lithium element, and the acceptor component of the charge-transfer complex is a halogen.

5. The cell according to claim 4 wherein the acceptor component of the charge-transfer complex is iodine.

6. The cell according to claim 1 wherein the body is in the form of a sheet and is on the order of about 0.07 to 0.17 mm in thickness.

7. The cell according to claim 1 wherein the body is affixed to the anode by an adhesive.

8. An electrochemical cell comprising:
   an anode having an operative surface;
   an adjoining preformed sheet of P2VP positioned with one side thereof against at least a substantial part of the operative surface of the anode; and
   a cathode, including a charge-transfer complex of an organic electron-donor component and an electron-acceptor component, positioned to the other side of the sheet whereby the charge-transfer complex material operatively associates with the anode through the sheet, at least initially.

9. The cell according to claim 8 including an electrolyte between the sheet and the cathode.

10. The cell according to claim 8 wherein the cathode includes a charge-transfer complex comprising a polyvinylpyridine polymer and a halogen.

11. The cell according to claim 10 wherein the anode includes an operative lithium element.

12. The cell according to claim 11 wherein the acceptor component of the charge-transfer complex is iodine.

13. The cell according to claim 8 wherein the sheet is on the order of about 0.07 to 0.17 mm in thickness.

14. The cell according to claim 8 wherein the sheet is affixed to the anode by an adhesive.

15. The cell according to claim 14 wherein the organic donor material of the sheet is poly-2-vinylpyridine and the adhesive is the monomer 2-vinylpyridine.

16. The cell according to claim 8 wherein the organic donor component of the cathode charge-transfer complex is a polyvinylpyridine polymer.

17. A method of making an electrochemical cell wherein the anode includes an operative surface area and the cathode comprises a charge-transfer complex material, comprising the steps of:
   providing an anode having an operative surface to be associated with a cathode in a cell;
   providing a cathode including a charge-transfer complex material of an organic electron-donor component and an electron-acceptor component;
   placing a self-supporting preformed sheet comprising P2VP against the operative surface of the anode; and
   assembling the anode, the sheet and the cathode in electrochemically operative relationship with the sheet between the anode and cathode.

18. The method of claim 17 wherein the anode operative surface comprises lithium.

19. The method of claim 17 wherein the donor of the cathode charge-transfer complex is a polyvinylpyridine polymer.

20. The method of claim 17 wherein the acceptor component of the cathode charge-transfer complex is a halogen.

21. The method of claim 20 wherein the halogen is iodine.

22. A method of assembling an electrochemical cell wherein the anode includes an operative surface area and the cathode comprises a charge-transfer complex material, comprising the steps of:
providing an anode having an operative surface area;
providing a cathode comprising a charge-transfer complex material of an organic electron-donor component and an electron-acceptor component;
providing a self-supporting preformed sheet comprised of P2VP; and
assembling the anode and cathode in spaced relationship with the sheet therebetween and in contact with the anode.

23. The method of claim 22 wherein:
the anode operative surface comprises lithium, and
the cathode charge-transfer complex comprises a polyvinylpyridine polymer and a halogen.

24. The method of claim 23 wherein the halogen is iodine.

25. The method of claim 23 wherein the donor component of the charge-transfer complex material is poly-2-vinylpyridine.

26. The method of claim 25 wherein the halogen is iodine.

27. As an article of manufacture, an electrochemical cell comprising:
an anode,
a cathode, and wherein,
during the process of manufacture, a performed body comprising P2VP is positioned against the anode during assembly of the cell to form part of the cell structure.

28. The cell of claim 27 wherein the P2VP body is positioned against at least a substantial part of the operative surface of the anode.

29. The cell of claim 27 wherein the anode is comprised of lithium.

30. The cell of claim 27 wherein the cathode is comprised of a charge-transfer complex material.

31. The cell of claim 30 wherein the charge-transfer complex includes a halogen.

32. The cell of claim 31 wherein the halogen is iodine.

33. The cell of claim 30 wherein the charge-transfer complex includes P2VP.

34. The cell of claim 27 wherein the P2VP body is in sheet-like form.

35. The cell of claim 27 wherein the body is secured to the anode with an adhesive.

36. The cell of claim 27 wherein the cathode comprises a polyvinlypyridine polymer.

* * * * *

UNITED STATES PATENT AND TRADEMARK OFFICE
CERTIFICATE OF CORRECTION

PATENT NO. : 4,182,798
DATED : January 8, 1980
INVENTOR(S) : Paul M. Skarstad

It is certified that error appears in the above-identified patent and that said Letters Patent are hereby corrected as shown below:

Column 8, line 7, "performed" should be --preformed--.

Signed and Sealed this

Twenty-fifth Day of March 1980

[SEAL]

Attest:

SIDNEY A. DIAMOND

*Attesting Officer*     *Commissioner of Patents and Trademarks*